Sept. 16, 1969          L. A. NORDLIE          3,467,542

PROTECTION OF REFRACTORY BODIES FROM THERMAL SHOCK

Filed Dec. 13, 1965

*INVENTOR.*
*Lawrence A. Nordlie*

BY *Richard N. Wardell*

ATTORNEY 3,467,542
PROTECTION OF REFRACTORY BODIES FROM THERMAL SHOCK
Lawrence A. Nordlie, Corning, N.Y., assignor to Corhart Refractories Company, Inc., Louisville, Ky., a corporation of Delaware
Filed Dec. 13, 1965, Ser. No. 513,399
Int. Cl. B05b 13/06
U.S. Cl. 117—94                                10 Claims

ABSTRACT OF THE DISCLOSURE

Refractory articles (e.g. sheaths for immersion-type thermocouple units, bricks, ladle stoppers, etc.) that are disposed in containers for highly heated molten material (e.g. molten steel at 1000° C. or higher) and capable of withstanding the severe thermal shock, without structural damage, of sudden contact with the molten material. Each article comprises a body of refractory and an adherent composite coating on a surface of the body that is to be contacted by the molten material, which coating consists of film-forming organic coating polymer having finely divided particles of refractory imbedded therein in an amount sufficient to provide a continuous shell of sintered particles and carbonized polymer on the body surface after contact with the molten material.

BACKGROUND OF THE INVENTION

Field of the invention

This invention relates to improvements in refractory bodies or articles that must withstand the severe thermal shock of sudden contact with molten materials, particularly molten ferrous metals and slags of steelmaking processes, without cracking or other structural damage. The invention also especially relates to improvements in tubular refractory sheaths for immersion-type thermocouple units employed in measuring or sensing the temperature of molten materials and particularly of the molten metals and slags in steelmaking processes.

Description of the prior art

The need for more accurate temperature sensing devices having long term useful lives for better steelmaking process control has been an ever present problem. The rapidity of the present day steelmaking processes employing oxygen lancing has made quick, accurate and continuous temperature control more critical for producing the desired good quality product. One common means of quick and accurate temperature determination has been the use of immersion-type thermocouple units in which the thermocouple is enclosed in a disposable closed-end tubular sheath. The more common fused silica or quartz sheaths are able to withstand the severe thermal shock of immersion in the molten bath and to provide a quick thermal response within a few seconds, but they are rapidly attacked and their useful life ended by the corrosive molten materials within several seconds to one minute or so. As a result, these sheaths provided only a single temperature determination or a very short term temperature sensing duration. More recently, sheaths of generally much longer useful life, because of greater resistance to corrosion by the molten metals and slags, have been developed. These are made of a shaped and sintered mass of finely divided refractory grains having a size less than 149 microns, which mass analytically comprises essentially, by weight, 3 to less than 15% $TiO_2$, 0.8 to 25% $Cr_2O_3$, 40 to less than 95% MgO and the sum of $TiO_2+Cr_2O_3+MgO$ being at least 75%. These recently developed sheaths are also characterized generally by a relatively high resistance to sudden and severe thermal shock, such as results from immersion in molten baths at temperatures of about 1000°–1700° C. or more. But despite the latter general characteristic, an undesirable number of those sheaths were found to crack or develop fractures upon "upshock" during immersion of the sheaths, which were at room temperature, into molten steel at temperatures of 1550° to 1700° C.

SUMMARY OF THE INVENTION

The present invention is based upon the discovery that the foregoing "upshock" problem can be practically eliminated relatively inexpensively, but effectively, by forming a particular type of composite coating layer upon and adherent to the surface of the body of refractory that is to suddenly contact molten material. This particular type of composite coating consists of film-forming organic coating polymer or resin that contains finely divided particles of refractory compound imbedded within the polymer or resin coating film or layer. Generally suitable coatings have a refractory particle content of at least 40% by weight.

While the theory of the protective capability against "upshock" of the coating is not fully understood, it appears that the coating acts in some manner as a barrier to the initial and most detrimental thermal "upshock" caused by sudden contact with molten material and thus prevents the development of destructive thermal gradients in the refractory body. During contact with or immersion in molten material, such as molten steel, it has been found that the composite coating forms a continuous, relatively hard shell in which the particles of refractory compound sinter and/or fuse together and the polymer or resin apparently carbonizes (due to the molten material keeping the oxygen of the air away from the coating) as a matrix around the sintered and/or fused refractory particles. Also, in most cases, it is found that this resultant shell is firmly adherent to the refractory body due to sintering between the body and the refractory particles in the coating. Occasionally, after removal from the molten material, the resultant shell could be somewhat peeled away leaving the sheath in substantially its original condition before being coated. This demonstrated that the composite coating (and resultant shell) also acted to further protect, in a very substantial way, the refractory body from chemical attack or corrosion for substantial periods of time. Moreover, the continuity and coherency of the coating and its resultant shell further contribute protection against mechanical abuse, such as would be the case for the sheaths of immersion-type thermocouple units employed in determining the temperature of violently agitated molten materials (e.g. as in a basic oxygen steelmaking process).

Numerous tests of immersion-type thermocouple sheaths according to this invention have shown consistently reliable long term service lives in molten ferrous metal and slag for as long as one hour or more. Moreover, they have been found capable of excellent service results with repeated withdrawal and reimmersion in molten steel baths.

Besides the immersion-type refractory sheaths, the invention is also applicable to other refractory bodies, such as bricks, ladle stoppers, etc., whose surfaces that are subject to sudden contact with molten material can be protected against the severe thermal shock as well as chemical corrosion and/or mechanical abuse by forming the composite polymer-refractory particle coating on those surfaces.

BRIEF DESCRIPTION OF THE DRAWING

The invention may be better understood from the following detailed description in conjunction with the accompanying drawing in which.

DESCRIPTION OF THE PREFERRED EMBODIMENTS

Figure 1:
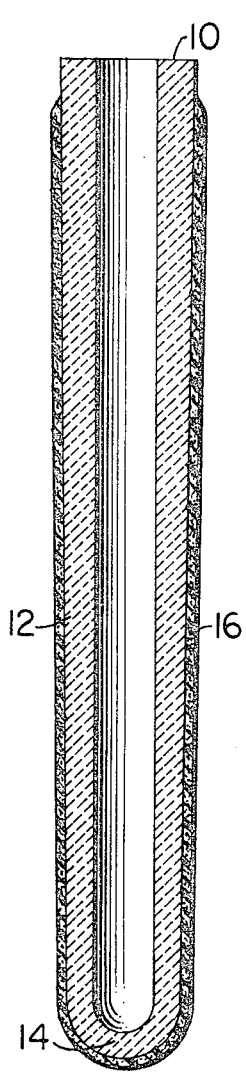
FIGURE 1 is a view in longitudinal cross section of a refractory sheath according to this invention for an immersion-type thermocouple unit.

In carrying out this invention, a shaped refractory body is formed of refractory material suitable for the particular desired service application. For example, in the case of an immersion-type thermocouple unit for sensing the temperature of a bath of molten ferrous metal and basic slag, finely divided basic refractory material can be molded into the shape of the body 10 shown in FIGURE 1 by slip casting or other suitable ceramic forming process. Basic refractory material is employed because of its desirable characteristic of good resistance to the chemically corrosive nature of molten ferrous metal and basic slag. The body 10 is formed with a main elongated tubular portion 12 and with a rounded end portion 14 closing one end of the tubular portion 12, so as to form an internal well into which the thermocouple element (not shown) can be placed and protected by the body 10.

Preferably, the body 10 is a basic refractory composed of a sintered mass of refractory grains having a size less than 149 microns and analytically consisting essentially of, by weight, 3 to less than 15% $TiO_2$, 0.8 to 25% $Cr_2O_3$, 40 to less than 95% MgO, the sum of

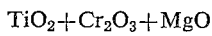

$$TiO_2 + Cr_2O_3 + MgO$$

being at least 75%, up to 15% $Fe_2O_3$, less than 7.5% $Al_2O_3$, less than 2% $SiO_2$ and less than 1% CaO.

In preparing the composite coating 16, generally any film-forming organic coating polymer or resin, which has the capability of forming a coating film, can be employed. Usually such polymer or resin will be a liquid or can be liquefied by liquid solvent or vehicle (organic or aqueous) to form a solution, dispersion, suspension, emulsion, latex or the like which can be applied to the desired surface of the refractory body 10 by means of dipping, brushing, rolling, spraying or the like. Among the many film-forming organic coating polymers, the following are mentioned by way of illustration as suitable for the present invention: natural resins, shellac and drying oils; phenolic resins such as phenol-aldehyde resins and terpene-phenolic resins; coumarone-indene resins; alkyd resins such as polymers of phthalic anhydride and glycerine, terephthalic acid and pentaerythritol, esters of glycerine and unsaturated acids, oil modified alkyd resins, and copolymers of alkyd resins and styrene; epoxide (epoxy) resins such as condensation products of epichlorohydrin and bis-phenol; isocyanate resins such as fatty acid modified urethane resins ("urethane oil" polymers); aminoplast resins such as urea-formaldehyde resins, and melamine-formaldehyde resins; rubber polymers such as chlorinated rubber, natural rubber, and styrene-butadiene copolymers; cellulose coating resins such as cellulose nitrate, cellulose acetate, ethyl cellulose, and cellulose butyrate; vinyl resins such as vinyl acetate, vinyl chloride, copolymers of vinyl chloride and vinyl acetate, copolymers of vinyl acetate and vinylidene chloride, vinyl butyral resins, and vinyl acetate-vinyl alcohol resins; acrylonitrile resins; acrylic ester resins such as methylacrylate, methyl methacrylate and butylmethacrylate; silicon resins such as methylphenylsilicone resins; and modified silicone resins such as silicone modified alkyd resins, silicone modified phenolic acids, silicone modified epoxy resins and silicon modified aminoplast resins. It should be understood that the film-forming organic coating polymer composition for this invention can also be any combination of the above type materials either in the form of mixtures or copolymers as is desired for any particular application.

For economy of processing procedure and time, it is preferable to employ those liquid coating compositions of film-forming organic polymers that have a relatively fast drying and/or curing time in ordinary air atmosphere, that have sufficient body, viscosity and tackiness to build up a substantial coating thickness with not more than two or three applications of the liquid coating composition and to adherently hold the finely divided refractory particles uniformly dispersed in the coating while it dries, and that has the characteristic of a second or subsequent application thereof not significantly reliquefying the previously applied thickness or layer of coating. An especially good example giving these results was found to be a solution coating composition consisting of a copolymer of vinyl chloride and vinyl acetate in ketone-toluene solvent-thinner.

The finely divided particles of refractory compound can be imbedded in the film-forming organic polymer of the coating in several ways. A first method is to thoroughly stir a desired proportion of the particles into the liquid coating composition and then apply this liquid suspension to the surface of the refractory body one or more times to build up the desired thickness. A second method is to apply the liquid coating composition, without the particles, to the surface of the body and then immediately sprinkle the particles all over the coating layer before it has any substantial time to dry, which results in the particles sticking to the whole surface of the coating layer. Then these two steps are repeated alternately until the desired thickness of composite coating has been built up. Preferably, however, it is desirable for optimum results to first employ the initial two steps of the second method and then for subsequent applications to employ the liquid suspension of particles in coating composition as in the first method to build up the final thickness of composite coating.

The particular refractory material selected for making up the particles of refractory compound will, of course, depend upon what is suitable for the particular service application of the refractory article of this invention. In the case of the thermocouple unit mentioned above for use in molten ferrous metal and basic slag, basic or other refractory material that does not react with the basic refractory body to form different crystalline phases with poor corrosion resistance would be the necessary choice. Preferably, a material for these particles analytically consists essentially of, by weight, at least 90% MgO, less than 2% CaO, less than 2% $SiO_2$ and less than 2% $Fe_2O_3$. Also in this case, silicone resins preferably should not be used since the silicon content may react with the refractory particles and the refractory body to form more easily corroded crystalline phases.

The following four examples will better serve to specifically illustrate the invention.

Example 1

A refractory body having the form of sheath 12 in FIGURE 1 was formed by slip casting a batch made from wholly −149 micron particle size raw materials composed of 80 wt. percent calcined high purity magnesia, 10 wt. percent of Transvaal chrome ore and 10 wt. percent of fritmakers grade of titania. After drying the green slip cast body, it was then sintered at 1650° C. for about 16 hours. The analytical composition, by weight, was 79.7% MgO, 10.0% $TiO_2$, 4.6% $Cr_2O_3$, 2.6% $Fe_2O_3$, 1.7% $Al_2O_3$, 0.5% $SiO_2$ and 0.8% CaO. Then the sintered body was dipped, closed end first, into a coating solution composition, which consisted of:

20 wt. percent copolymer of 87 wt. percent vinyl chloride and 13 wt. percent vinyl acetate.
80 wt. percent solvent-thinner composed of equal parts by volume of methyl ethyl ketone and toluene.

The viscosity or flow time of the coating solution, as measured by a #4 Zahn flow cup, was 18 seconds. Immediately upon removal of the sheath body from this first dip, −20+35 mesh (Tyler) particles of calcined high purity magnesia (98.45 wt. percent MgO, 0.66 wt. percent CaO, 0.16 wt. percent $SiO_2$, 0.14 wt. percent $Fe_2O_3$, 0.12 wt. percent ignition loss) were sprinkled all over the tacky coating surface. Next, a liquid suspension was prepared by thoroughly stirring 1 part by weight of the calcined high purity magnesia comminuted to −200 mesh (Tyler) into 1.5 parts by weight of the same coating solution. Then the sheath body was dipped into the liquid suspension only once. From these two successive dipping steps, a composite coating of exceptionally satisfactory thickness, continuity and uniformity was obtained after a relatively short air drying period (at room temperature) of about one hour. A quicker drying period can be attained by gently heating (e.g. at 35°–65° C.) the coated body.

Example 2

A refractory body and coating procedure as in Example 1 was employed. However, the coating composition was shellac with a flow time of 5 seconds as measured by a #4 Zahn flow cup. The liquid suspension was composed of 1.5 parts by weight of −200 mesh (Tyler) particles of the calcined high purity magnesia and 1 part by weight of shellac. After a room temperature air drying period of approximately 6 hours, a satisfactory coating was obtained.

Example 3

Again a refractory body and coating procedure as in Example 1 is employed. But the coating composition is a latex type paint with a flow time of 10 seconds (based on #4 Zahn flow cup) and consists essentially of, by weight:

22.8% calcium carbonate
18.0% titanium dioxide
16.1% china clay
10.4% resin mixture of: (a) 80 wt. percent copolymer of 60 wt. percent styrene and 40 wt. percent butadiene, and (b) 20 wt. percent long oil soya bean alkyd resin having a phthalic anhydride content of about 25 wt. percent.
40.7% water and driers (the driers amount to about 0.034% of which about 0.03% is lead naphthenate containing 34 wt. percent Pb and about 0.004% is cobalt naphthenate containing 10 wt. percent Co).

The liquid suspension is made of 1 part by weight of −200 mesh (Tyler) particles of the calcined high purity magnesia and 1 part by weight of the latex type paint. A drying time of 2 to 3 hours in air at room temperature gives a very satisfactory composite coating.

Example 4

Once again a refractory body as in Example 1 is employed, but the first dipping step is repeated 5 or 6 times because a "urethane oil" type of coating composition is employed, which is very fluid and requires the repeated dipping to provide an initial coating layer sufficiently thick enough for the sprinkled magnesia particles to stick on it. Otherwise, the procedure is the same as in Example 1. The polyurethane or "urethane oil" type coating composition has a flow time of 3.5 seconds (based on #4 Zahn flow cup) and consists essentially of, by weight:

42% urethane polymer being essentially devoid of free isocyanate and which is the substantially stoichiometric reaction product of: (a) a mixture of 80 wt. percent 2,4-tolylene diisocyanate and 20 wt. percent 2,6-tolylene diisocyanate, and (b) partial glyceride esters (principally mono- and di-glycerides) of peanut oil.
57% odorless aliphatic hydrocarbon mineral (white) spirits with a boiling range of approximately 180°–207° C. and a closed cup flash point of about 54° C.
1% dried solutions comprising approximately: (a) 0.7% mineral spirits solution containing about 62 wt. percent lead naphthenate of which the Pb content is about 24 wt. percent and (b) 0.3% mineral spirits solution containing about 56 wt. percent cobalt naphthenate of which the Co content is about 6 wt. percent.

The liquid suspension is made of 1.5 parts by weight of −200 mesh (Tyler) particles of the calcined high purity magnesia and 1 part by weight of the polyurethane coating composition. A drying or curing time of approximately 24 hours in air at room temperature gives a satisfactory composite coating.

Because of the greater ease of manufacture and better resultant coating of the coated refractory sheath in Example 1, a number of similar sheaths were made and tested with the following results:

(1) Sheath still in good condition after one hour in molten steel made in an induction melting furnace and at temperatures ranging from 1572° C. to 1615° C.

(2) Sheath still in good condition after 53 minutes in an open hearth furnace bath of molten steel and slag occasionally violently agitated by two oxygen lances between which the sheath was located.

(3) Sheath still in good condition after seven repeated immersions and withdrawals with each immersion lasting about two minutes over a total period of 22 minutes in molten steel at 1550° C. in an induction melting furnace.

(4) Sheath in perfect condition after 5 minutes in the molten contents of a basic oxygen L.D. steelmaking vessel.

(5) Sheath in good condition after 45 minutes in a molten steel pool in a tundish of a continuously casting unit.

Figure 2:
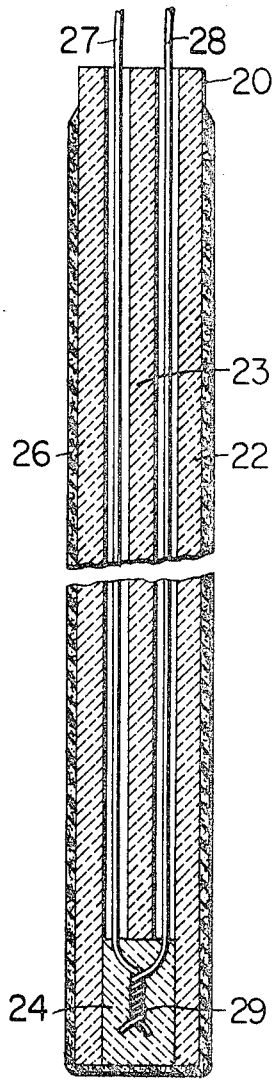
FIGURE 2 is a view in longitudinal cross section of another form of refractory sheath according to this invention, shown with a thermocouple element therein, for use as an immersion-type temperature sensing device.

FIGURE 2 illustrates a simple miniature type of immersion thermocouple sheath that may be useful in many cases where a more substantial structure, as in FIGURE 1, is not required. The refractory body 20 of the sheath comprises a ceramic sleeve or rod 22, of the type commonly used to hold thermocouple elements, having two bores or holes longitudinally therethrough, which are separated by a web portion 23 and a portion 24 closing one end of the tubular rod 22. Thermocouple wire elements 27, 28 extend down through separate bores and are brought together to form a junction 29 at the lower end where the lower part of web 23 has been cut away so that the junction can be contained wholly up inside the body 20. Rod 22 can be made of sintered alumina, magnesia or other suitable refractory material. Desirably a similar refractory material in finely divided form is packed into the bottom opening of rod 22 and sintered to form portion 24 after the thermocouple 27, 28, 29 has been placed within rod 22. This resulting assembly is of the size and type that normally fits into the well of sheath 10 in FIGURE 1; hence, its small size will be appreciated from this fact, although for clear understanding it is shown in a larger scale in FIGURE 2. Finally, the composite coating 26 is put on the body 20 in similar manners and with similar coating compositions and refractory particle compositions.

Figure 3:
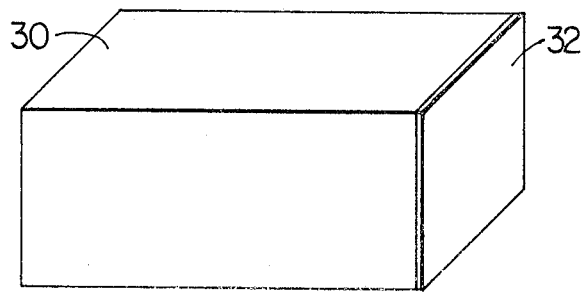
FIGURE 3 is a refractory brick according to this invention suitable as a component of a refractory lining in a furnace, vessel or other container for molten material.

FIGURE 3 illustrates the application of the invention to an embodiment completely different than thermocouple immersion sheath. Shown there is a common refractory brick 30 for forming the inside wall of a furnace or similar container that is to have molten materials placed into it or passed through it. The face of the brick that is to be subject to sudden contact with molten material, such as molten metals and/or slags, is covered with an adherent composite coating 32 as described above. By this means, the so-called "hot face" of the brick 30 is substantially protected against thermal shock spalling and cracking that would otherwise likely occur.

Of course, the invention is not limited to refractory sheaths or bricks, but it is also applicable to ladle stoppers and any other refractory article that has to suffer the severe thermal shock of sudden contact with highly heated molten materials. Moreover, the invention is not limited to refractory articles made only of basic refractory material, but it also includes refractory materials appropriate to other molten materials as is known in the art or found suitable therefor.

I claim:

1. A refractory sheath for an immersion type thermocouple unit comprising:
   (a) a body of refractory comprising a tubular portion and a portion closing one end of said tubular portion, and
   (b) a composite coating on the outside surfaces of said body, said coating consisting of film-forming organic coating polymer having finely divided particles of refractory compound embedded therein, said particles being present in an amount sufficient to provide a continuous shell of sintered particles and carbonized polymer on said surface after contact with said molten material.

2. The refractory sheath of claim 1 wherein said particles are present in an amount of at least 40% by weight of said coating.

3. The refractory sheath of claim 2 wherein said polymer is a copolymer of vinyl chloride and vinyl acetate.

4. The refractory sheath of claim 2 wherein:
   (a) said body is composed of basic refractory material, and
   (b) said particles are composed of basic refractory material.

5. The refractory sheath of claim 4 wherein:
   (a) said body is composed of a sintered mass of refractory grains having a size less than 149 microns and said mass analytically consists essentially of, by weight, 3 to less than 15% $TiO_2$, 0.8 to 25% $Cr_2O_3$, 40 to less than 95% MgO, the sum of $TiO_2+Cr_2O_3+MgO$ being at least 75%, up to 15% $Fe_2O_3$, less than 7.5% $Al_2O_3$, less than 2% $SiO_2$ and less than 1% CaO, and
   (b) said particles analytically consist essentially of, by weight, at least 90% MgO, less than 2% CaO, less than 2% $SiO_2$ and less than 2% $Fe_2O_3$.

6. In the combination of a container for molten material and a body of refractory disposed in said container to suddenly contact said molten material,
   the improvement comprising a composite coating on a surface of said body that is to be contacted by said molten material, said coating consisting of film-forming organic coating polymer having finely divided particles of refractory compound embedded therein, said particles being present in an amount sufficient to provide a continuous shell of sintered particles and carbonized polymer on said surface after contact with said molten material.

7. The combination of claim 6 wherein said particles are present in an amount of at least 40% by weight of said coating.

8. The combination of claim 7 wherein said polymer is a copolymer of vinyl chloride and vinyl acetate.

9. The combination of claim 7 wherein:
   (a) said body is composed of basic refractory material, and
   (b) said particles are composed of basic refractory material.

10. The combination of claim 9 wherein:
    (a) said body is composed of a sintered mass of refractory grains having a size less than 149 microns and said mass analytically consists essentially of, by weight, 3 to less than 15% $TiO_2$, 0.8 to 25% $Cr_2O_3$, 40 to less than 95% MgO, the sum of $TiO_2+Cr_2O_3+MgO$ being at least 75%, up to 15% $Fe_2O_3$, less than 7.5% $Al_2O_3$, less than 2% $SiO_2$ and less than 1% CaO, and
    (b) said particles analytically consist essentially of, by weight, at least 90% MgO, less than 2% CaO, less than 2% $SiO_2$ and less than 2% $Fe_2O_3$.

References Cited

UNITED STATES PATENTS

| 3,379,578 | 4/1968 | McTaggart et al. | 136—234 |
| 1,773,825 | 8/1930 | Simms | 136—242 |
| 2,439,396 | 4/1948 | Leatherman. | |
| 2,821,514 | 1/1958 | Sarbach et al. | 117—137 X |
| 2,942,970 | 6/1960 | Goetzel et al. | 117—94 X |
| 2,962,052 | 11/1960 | Sergovic | 117—94 X |
| 3,011,006 | 11/1961 | Nicholson et al. | 136—234 X |

RALPH S. KENDALL, Primary Examiner

C. K. WEIFFENBACH, Assistant Examiner

U.S. Cl. X.R.

117—100, 137; 136—234, 242